US011964287B2

(12) United States Patent
Bruce

(10) Patent No.: US 11,964,287 B2
(45) **Date of Patent: *Apr. 23, 2024**

(54) SHOWER HEAD

(71) Applicant: Robert William Bruce, Loveland, OH (US)

(72) Inventor: Robert William Bruce, Loveland, OH (US)

( * ) Notice: Subject to any disclaimer, the term of this patent is extended or adjusted under 35 U.S.C. 154(b) by 758 days.

This patent is subject to a terminal disclaimer.

(21) Appl. No.: 16/971,208

(22) PCT Filed: Feb. 22, 2019

(86) PCT No.: PCT/US2019/019116

§ 371 (c)(1),
(2) Date: Aug. 19, 2020

(87) PCT Pub. No.: WO2019/165182

PCT Pub. Date: Aug. 29, 2019

(65) Prior Publication Data

US 2021/0094050 A1 Apr. 1, 2021

Related U.S. Application Data

(63) Continuation of application No. 15/903,449, filed on Feb. 23, 2018, now Pat. No. 10,413,916.

(51) Int. Cl.

| | |
|---|---|
| ***B05B 1/16*** | (2006.01) |
| ***B05B 1/30*** | (2006.01) |
| ***E03C 1/04*** | (2006.01) |

(52) U.S. Cl.

CPC .......... *B05B 1/1654* (2013.01); *B05B 1/1627* (2013.01); *B05B 1/169* (2013.01); *B05B 1/3006* (2013.01); *E03C 1/0408* (2013.01)

(58) Field of Classification Search

CPC ....... B05B 1/16; B05B 1/1654; B05B 1/1627; B05B 1/169; B05B 1/3006; B05B 1/1636;

(Continued)

(56) References Cited

U.S. PATENT DOCUMENTS

| | | | |
|---|---|---|---|
| 5,476,225 | A | 12/1995 | Chan |
| 9,233,379 | B2 | 1/2016 | Zhou et al. |

(Continued)

OTHER PUBLICATIONS

PCT/US2019/019116 International Search Report dated Apr. 29, 2019.

(Continued)

*Primary Examiner* — Tuongminh N Pham
*Assistant Examiner* — Juan C Barrera
(74) *Attorney, Agent, or Firm* — Saxton & Stump, LLC

(57) ABSTRACT

A multi-function shower head including an upper housing, a lower housing, a base plate, the base plate having at least water passages and direct spray holes there-through for selectively enabling water outflow from the upper housing through the base plate, a sliding ring held by the lower housing against the base plate and having at least a second spray pattern, and at least one actuator to selectively align the second spray pattern in the sliding ring with the water passage in the base plate and to adjust from a first spray pattern to the second spray pattern. The base plate and the sliding ring are arranged and disposed with an operating mechanism to automatically adjust the water flow from the second spray pattern to the first spray pattern upon interrupting water flow through, and pressure to the base plate.

17 Claims, 7 Drawing Sheets

(58) Field of Classification Search

CPC B05B 1/1681; B05B 1/18; B05B 1/32; B05B 1/1645; B05B 1/1663; B05B 3/04; B05B 1/3026; B05B 1/12; B05B 1/1609; B05B 12/002; E03C 1/0408

USPC .......................................................... 239/447

See application file for complete search history.

(56) References Cited

U.S. PATENT DOCUMENTS

| | | | |
|---|---|---|---|
| 9,242,254 | B2 | 1/2016 | Zhou et al. |
| 9,254,494 | B2 | 2/2016 | Lin et al. |
| 9,283,575 | B2 | 3/2016 | Lin et al. |
| 9,289,785 | B2 | 3/2016 | Buehler et al. |
| 9,295,997 | B2 | 3/2016 | Harwanko et al. |
| 9,314,801 | B2 | 4/2016 | Glunk et al. |
| 9,573,143 | B2 | 2/2017 | Lin et al. |
| 9,586,214 | B2 | 3/2017 | Lee |
| 9,610,594 | B2 | 4/2017 | Chan |
| 9,656,281 | B2 | 5/2017 | Kinle |
| 9,757,742 | B2 | 9/2017 | Alcamo |
| 9,815,069 | B2 | 11/2017 | Hou et al. |
| 9,829,116 | B2 | 11/2017 | Xu et al. |
| 2009/0127353 | A1* | 5/2009 | Meisner .................... B05B 1/18 239/394 |
| 2014/0027234 | A1 | 1/2014 | Zhou et al. |
| 2014/0319248 | A1 | 10/2014 | Kinle |
| 2014/0346255 | A1 | 11/2014 | Zhou et al. |
| 2016/0221006 | A1 | 8/2016 | Lin et al. |
| 2017/0100727 | A1 | 4/2017 | Lin et al. |
| 2017/0100728 | A1 | 4/2017 | Gong et al. |
| 2017/0120264 | A1 | 5/2017 | Lin et al. |

OTHER PUBLICATIONS

Supplementary European Search Report, dated Sep. 9, 2021, 9 pages.

* cited by examiner

SHOWER HEAD

BACKGROUND OF THE INVENTION

The present invention generally relates to fixtures adapted to dispense liquids, including but not limited to, water nozzles commonly referred to as shower heads.

As used herein, the term "shower head" broadly refers to a perforated nozzle located in a shower to distribute water over an individual, typically from overhead. Adjustable shower heads are available today that are adapted to provide multiple different spray patterns through a manual adjustment, for example, rotating a ring surrounding the shower head. Once adjusted for a particular spray pattern, the adjustment persists until another manual adjustment is made. As a result, the last selected spray pattern will resume after water flow has been restarted following a stoppage. For example, when a wide pattern selection is manually selected from an original narrow spray pattern, the wide pattern remains when the water flow is restarted and may extend beyond the intended area, for example an open shower curtain or open shower door.

Though a shower head may provide a variety of spray patterns (for example, gentle, strong, massage, intermittent pulse), typical spray patterns are relatively narrow with an angle from the center line or central axis of the shower head of not more than 5 degrees. Wider spray patterns may be made available by switching the water flow to a different fixture or by adding flow to an additional fixture. Such fixtures are usually stationary and supplied by a different water supply line or with a line extension. As such, these fixtures often require additional plumbing and fixture costs and may cause the shower water temperature to drop when switching to the new or extended line, as the different or alternative fixture is still cold.

In view of the above, it can be appreciated that there is an ongoing desire for shower heads that produce multiple spray patterns that automatically return to a predetermined or first spray pattern, for example, from a relatively wide spray pattern to a narrower spray pattern, when water pressure and supply is turned off. Further, there is a need for shower heads with manually adjustable spray patterns, but automatically return from a manually selected spray pattern to a predetermined spray pattern when water pressure and supply is turned off without additional plumbing and/or fixture or wear, and without a significant drop in water temperature when changing spray patterns.

BRIEF DESCRIPTION OF THE INVENTION

The present invention provides devices suitable for shower heads that automatically adjusts water flow from at least a second spray pattern to a first spray pattern upon interrupting water flow.

According to one aspect of the invention, a device is provided that includes a multi-function shower head with an operating mechanism comprising an upper housing having an open end for water entry, a lower housing coupled to the upper housing opposite the open end thereof, a base plate received in a recessed locating cavity of the upper housing or the base plate being an integral part of the upper housing, the base plate having at least water passages and direct spray holes there-through for selectively enabling water outflow from the upper housing through the base plate, a sliding ring held by the lower housing against the base plate and having at least a second spray pattern therein, at least one actuator for rotating the sliding ring relative to the base plate and thereby selectively align the second spray pattern in the sliding ring with the water passages in the base plate and to adjust from a first spray pattern to the second spray pattern, and where the base plate and the sliding ring are arranged and disposed with an operating mechanism to automatically adjust the water flow from the second spray pattern to the first spray pattern upon interrupting water pressure to the base plate.

According to another aspect of the invention, a device is provided that includes an upper housing having an open end for water entry, a lower housing coupled to the upper housing opposite the open end thereof, a base plate received in a recessed locating cavity of the upper housing or the base plate being an integral part of the upper housing, the base plate having at least water passages and direct spray holes there-through for selectively enabling water outflow from the upper housing through the base plate, and at least one actuator supply hole, at least one pressure chamber and at least one spring cavity formed therein having at least one actuator spring fitted in at least one spring cavity of the base plate, a sliding ring held by the lower housing against the base plate and having at least a second spray pattern, at least one pressure dam having vents on each side thereof received in at least one pressure chamber of the base plate, wherein the sliding ring is actuated to facilitate water entry upon exposing at least one actuator supply hole to at least one pressure chamber and water entry enabling at least one pressure dam to adjust to the end of the pressure chamber, at least one actuator for rotating the sliding ring relative to the base plate and thereby selectively align the second spray pattern in the sliding ring with the water passages in the base plate and to adjust from a first spray pattern to the second spray pattern and where the base plate and the sliding ring are arranged and disposed with an operating mechanism to automatically adjust the water flow from the second spray pattern to the first spray pattern upon interrupting water flow through, and water pressure to, the base plate.

According to another aspect of the invention, a shower arrangement having a multi-function shower head arranged to spray water on a user, the multi-function shower head including a multi-function shower head with an operating mechanism comprising an upper housing having an open end for water entry, a lower housing coupled to the upper housing opposite the open end thereof, a base plate received in a recessed locating cavity of the upper housing or the base plate being an integral part of the upper housing, the base plate having at least water passages and direct spray holes there-through for selectively enabling water outflow from the upper housing through the base plate, a sliding ring held by the lower housing against the base plate and having at least a second spray pattern therein, at least one actuator for rotating the sliding ring relative to the base plate and thereby selectively align the second spray pattern in the sliding ring with the water passages in the base plate and to adjust from a first spray pattern to the second spray pattern, and where the base plate and the sliding ring are arranged and disposed with an operating mechanism to automatically adjust the water flow from the second spray pattern to the first spray pattern upon interrupting water flow and water pressure to the base plate. The actuation of the multi-function shower head in the shower arrangement provides a user with a spray pattern that is sufficiently wide to spray water on the user's shoulders with the second spray pattern and wherein the first spray pattern does not result in spray outside of the shower arrangement.

Other aspects and advantages of this invention will be further appreciated from the following detailed description.

BRIEF DESCRIPTION OF THE DRAWINGS

Wherever possible, the same reference numbers will be used throughout the drawings to represent the same parts.

DETAILED DESCRIPTION OF THE INVENTION

FIGS. 1 through 3E depict certain aspects of a non-limiting embodiment of a multi-function shower head with an operating mechanism that includes a means or arrangement for automatically adjusting the water flow from any one or more different spray patterns to a predetermined spray pattern upon interrupting water flow through, and water pressure to, the base plate.

Figure 1:
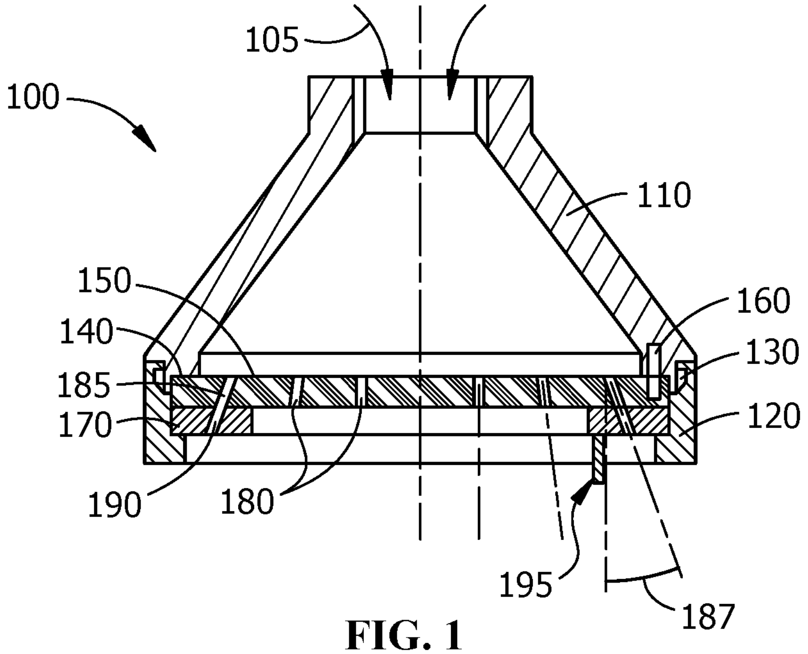
FIG. 1 is a cross sectional view of a multi-function shower head with operating mechanism in accordance with a non-limiting embodiment of this invention.

The non-limiting device disclosed in FIGS. 1 through 3E includes an upper housing 110 having an open end 105 for water entry and a lower housing 120 coupled to the upper housing 110 opposite the open end 105 thereof and defining therewith a recessed locating cavity 140. A base plate 150 is received in the recessed locating cavity 140, or is an integral part of the upper housing, and includes at least water passages 185 and direct spray holes 180 there-through for selectively enabling water outflow from the upper housing 110 through the base plate 150 in a first spray pattern and at least one additional spray pattern, herein referred to as a second spray pattern as a matter of convenience. A sliding ring 170 is held by the lower housing 120 against the base plate 150 and includes at least spray holes 190 of the second spray pattern therein. As shown in FIG. 1, the spray holes 190 may provide a flow of water at a spray angle 187. The spray angle 187 is an angle of the water sprayed measured from a parallel line to the center or central axis of the shower head 100. The spray angle or angles 187 that may be provided in the second spray pattern may be greater than or equal to about 5°, 10°, 15°, 20°, 25°, 30° or 35°, from about 5°, 10°, 15°, 20°, 25°, or 30° to about 10°, 15°, 20°, 25°, 30° or 35°, preferably from about 10° to about 35°. The multi-function shower head includes at least one actuator 195 for rotating the sliding ring 170 relative to the base plate 150 and thereby selectively aligning the second spray holes 190 in the sliding ring 170 with the water passages 185 in the base plate 150 and a means or arrangement for automatically adjusting the water flow from the second spray pattern to the first spray pattern upon interrupting water flow through, and pressure to, the base plate 150. In a preferred embodiment, the sliding ring 170 is a means or arrangement for automatically adjusting the water flow pattern.

FIGS. 3A through 3E depict enlarged partial cross-sectional views of the operating mechanism of the multi-function shower head of FIG. 1. In FIGS. 3A through 3E, the base plate 150 may also include at least one actuator supply hole 355, at least one pressure chamber 367 and at least one spring cavity 357 formed therein. The sliding ring 170 may include at least one pressure dam 375 received in the at least one pressure chamber 367 of the base plate 150. At least one pressure dam 375 may further include vents 377 on each side of the at least one pressure dam 375. At least one actuator spring 397 may be fitted in the at least one spring cavity 357 of the base plate 150.

In the non-limiting embodiment shown in the drawings, the sliding ring 170 is actuated to facilitate water entry upon exposing at least one actuator supply hole 355 to at least one pressure chamber 367 and water entry enables at least one pressure dam 375 to adjust to the end of the pressure chamber 367.

FIGS. 3A through 3E represent the operating mechanism as having at least one pressure chamber 367 that may include a first and second pressure chamber 367, at least one actuator supply hole 355 that may include a first and second actuator supply hole 355, at least one actuator spring 397 that may include a first and second actuator spring 397 and at least one pressure dam 375 that may include a first and second pressure dam 375.

Figure 3A:
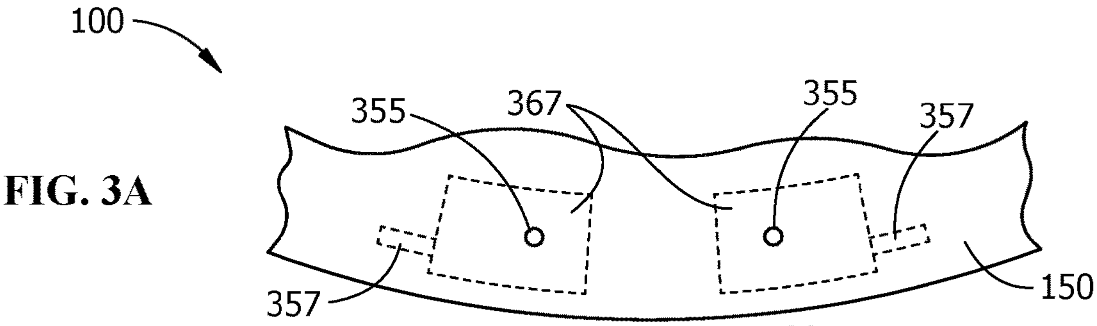
FIGS. 3A through 3E represent enlarged partial cross-sectional views of the operating mechanism of the multi-function shower head of FIG. 1.
Figure 3B:
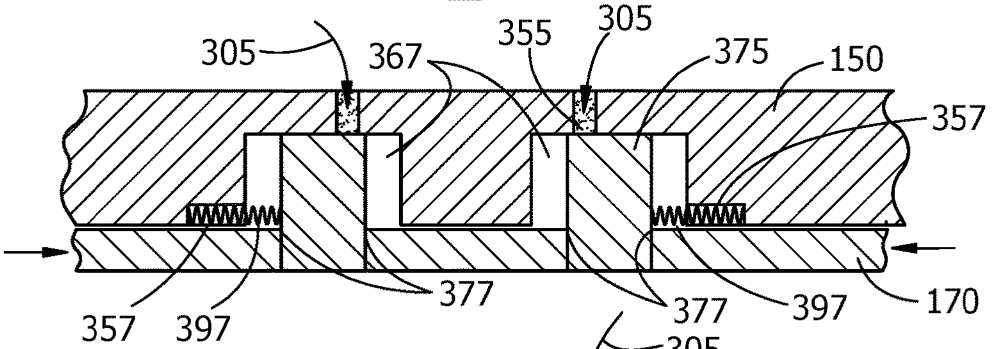

FIG. 3B depicts the operating mechanism in a central or neutral, inactivated position. The two springs 397 in adjacent pressure chambers 367 maintaining the sliding ring 170 in this neutral position.

Figure 3C:
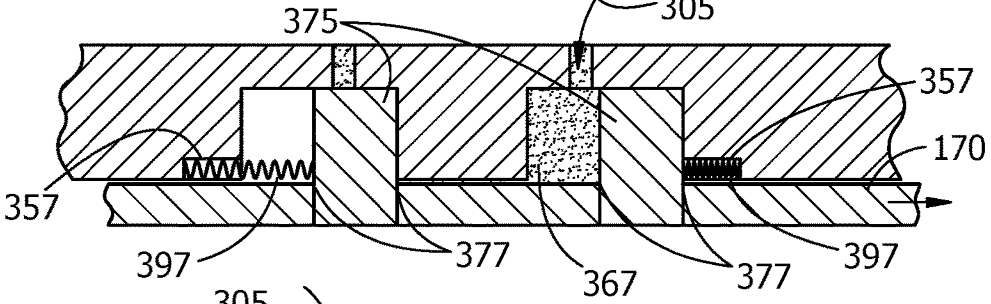

FIG. 3C depicts when the sliding ring 170, with pressure dams 375, is actuated to the right side of the first and second pressure chambers 367. The first and second pressure dams 375 may adjust to the right side of the first (on the left) and second (on the right) pressure chambers 367 enabling compression of the second actuator spring 397 in the second spring cavity 357 to the right. The first pressure dam 375 (on the left) blocks the first actuator supply hole 355 to prevent water entry 305 into the first pressure chamber 367 (on the left). Water flowing through the right actuator supply hole 355 providing pressure in the right pressure chamber 367 keeps the right spring 397 compressed and maintains the sliding ring 170 in the outer right position.

Figure 3D:
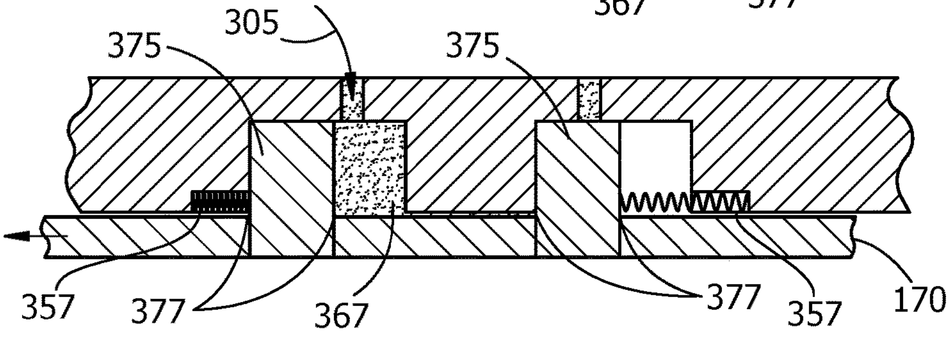

FIG. 3D depicts when sliding ring 170 with pressure dams 375 is actuated to the left side of the first and second pressure chambers 367. The first and second pressure dams 375 adjust to the left side of the first and second pressure chambers 367 enabling compression of the first actuator spring 397 in the first, left, spring cavity 357. The second pressure dam 375 in the second, right, pressure chamber blocks the second actuator supply hole 355 to prevent water entry 305 into the second pressure chamber 367. Water flowing from water entry 305 through the first, left, actuator supply hole 355 providing pressure in the first, left, pressure chamber 367 keeps the first, left, spring 397 compressed and maintains the sliding ring 170 in the outer left position.

Figure 3E:
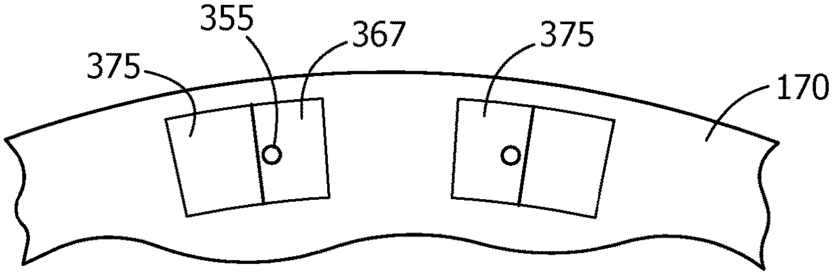

FIG. 3E depicts a cross section through the first and second pressure chambers 367 of FIG. 3D showing the first pressure chamber 367 on the left capable of filling with water through the actuator supply hole 355 while water flow to the second pressure chamber 367 on the right is blocked by the second pressure dam 375 positioned in front of the second actuator supply hole 355.

The sliding ring 170 enables the first spray pattern when the sliding ring 170 is in a closed central, neutral position shown in FIG. 3B. The sliding ring 170 further enables the second spray pattern when the sliding ring 170 is actuated to the open position of the right pressure chamber 367 shown in FIG. 3C, at least one pressure chamber 367 on the right is maintained in the open position while water flows through the base plate 150 and the sliding ring 170. When water pressure in the right pressure chamber 367 is reduced by interrupting water flow, and pressure, to the base plate 150, the compressed spring 397 in the right pressure chamber 367 automatically rotates the sliding ring 170 to the closed, central, neutral position of FIG. 3B.

The sliding ring 170 further enables the third spray pattern when the sliding ring 170 is actuated to the open position of the left pressure chamber 367 shown in FIGS. 3D and 3E, at least one pressure chamber 367 on the left is maintained in the open position while water flows through the base plate 150 and the sliding ring 170. When water pressure in the first pressure chamber 367 (on left) is reduced by interrupting water flow, and water pressure, to the base plate 150, the compressed spring 397 in the left pressure chamber 367 automatically rotates the sliding ring 170 to the closed, central, position of FIG. 3B.

The first spray pattern of the multi-function shower head may be, as a non-limiting example, a relatively narrow spray pattern, whereas the second spray pattern may be a relatively wider spray pattern. The spray patterns of the multi-function shower head may include at least three spray patterns. When the multi-function shower head includes at least three spray patterns, at least one of the at least three spray patterns may be blocked by eliminating one of the pressure chambers 367 and the associated pressure dam 375 spring cavity 357 and spring 397, or by closing one actuator supply hole 355 or by inserting an insert in one pressure chamber 367 that prevents the pressure dam 375 from compressing the actuator spring 397. In one embodiment, greater than three spray patterns may be provided by arranging independent sliding rings 170 in parallel or in series.

Figure 4A:
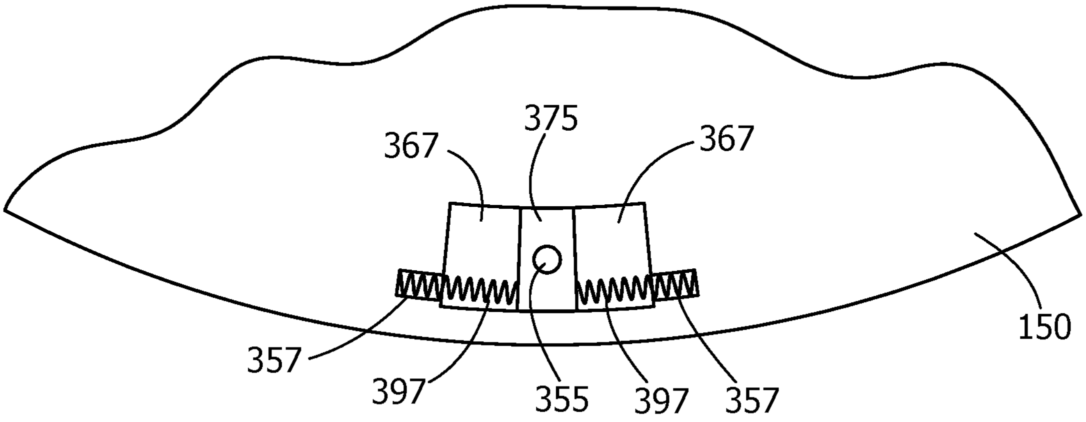
FIG. 4A represents an enlarged partial cross-sectional view viewed from above of an alternate embodiment of the operating mechanism of the multi-function shower head of FIG. 1.
Figure 4B:
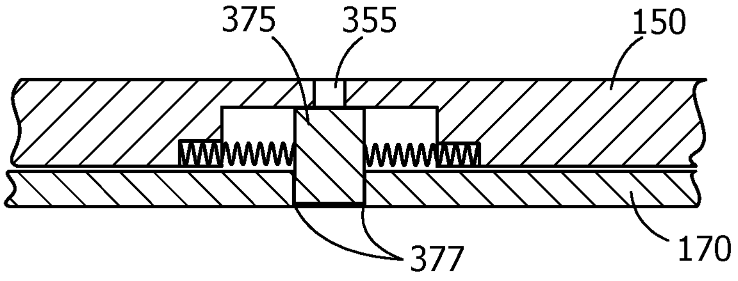
FIG. 4B represents an enlarged partial cross-sectional side view of the embodiment of the operating mechanism of the multi-function shower head of FIG. 1 or 4A.

FIGS. 4A and 4B represent an embodiment where the operating mechanism includes at least one pressure chamber 367 that may include a first and second pressure chamber 367, an actuator supply hole 355, a first and second actuator spring 397 and a single one pressure dam 375. The operating mechanism operates similarly to the operating mechanism shown and described in FIGS. 3A-3E, with a single pressure dam 375 and two pressure chambers 367.

FIGS. 4A and 4B depict the operating mechanism in a central or neutral, inactivated position. The two springs 397 in adjacent pressure chambers 367 maintaining the sliding ring 370 in this neutral position. As discussed in greater detail above with respect to FIGS. 3A through 3E, the operating mechanism is permitted to move with actuation of the sliding ring 170.

In operation of the operating mechanism of the multi-function shower head 100 of FIGS. 4A and 4B, the sliding ring 170 may be actuated either right or left about the axis of the shower head to permit filling of the first or second pressure chambers 367. Once the actuation is sufficient to move the pressure dam 375 to a location where the actuator supply hole 355 is aligned with the first or second pressure chambers 367, the corresponding pressure chamber 367 is filled with water. The pressure dam 375 may adjust to the right side of the first (on the left) and second (on the right) pressure chambers 367 enabling compression of the second actuator spring 397 in the second spring cavity 357 to the opposite side of the pressure chamber 367 being filled. Water flowing through the supply hole 355 provides pressure in the pressure chamber 367 and maintains the spring 397 in a compressed state and maintains the sliding ring 170 in position. Likewise, operation may happen in the opposite rotational direction and may fill the opposite pressure chamber 367.

Figure 5:
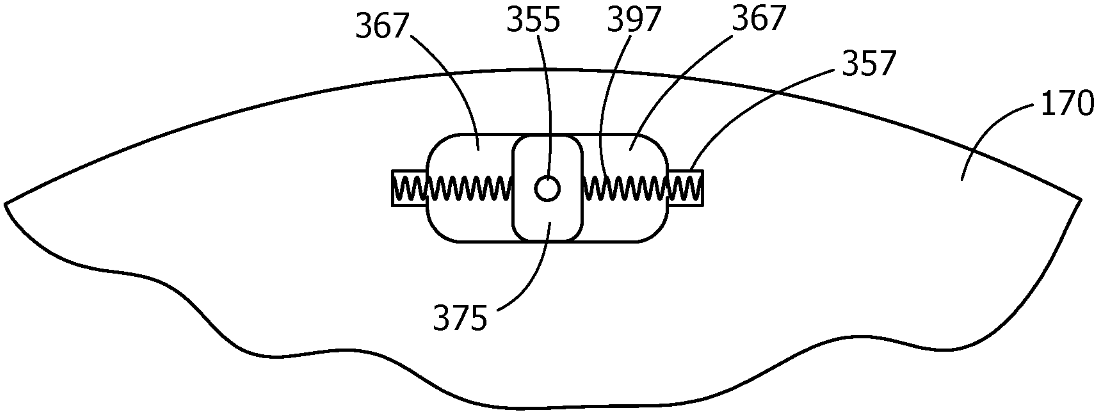
FIG. 5 represents enlarged partial cross-sectional views of an alternate embodiment of the operating mechanism of the multi-function shower head of FIG. 1.

FIG. 5 shows an arrangement of the operating mechanism of the multi-function shower head 100, as shown and described with respect to FIG. 4A, with an alternate geometry for the pressure dam 375 and the pressure chambers 367. The arrangement according to the embodiment shown in FIG. 5 has various operational and manufacturing advantages. For example, manufacturing radiused corners of the pressure chamber 367, as shown in FIG. 5, is less expensive and has a greater ease of manufacture than square corners. In addition, rounded edges of the pressure dam 375 sliding through the pressure chamber 367 instead of sharp edges minimizes the chance of scoring and jamming during operation. Further still, the elongated shape of the pressure dam 375 in the tangential direction minimizes water leakage past the pressure dam 375. The ends of the springs opposite the spring cavities 357 in the base plate 150, may be located in spring cavities 357 in the pressure dam 375, so both ends of the springs are securely located.

Figure 6A:
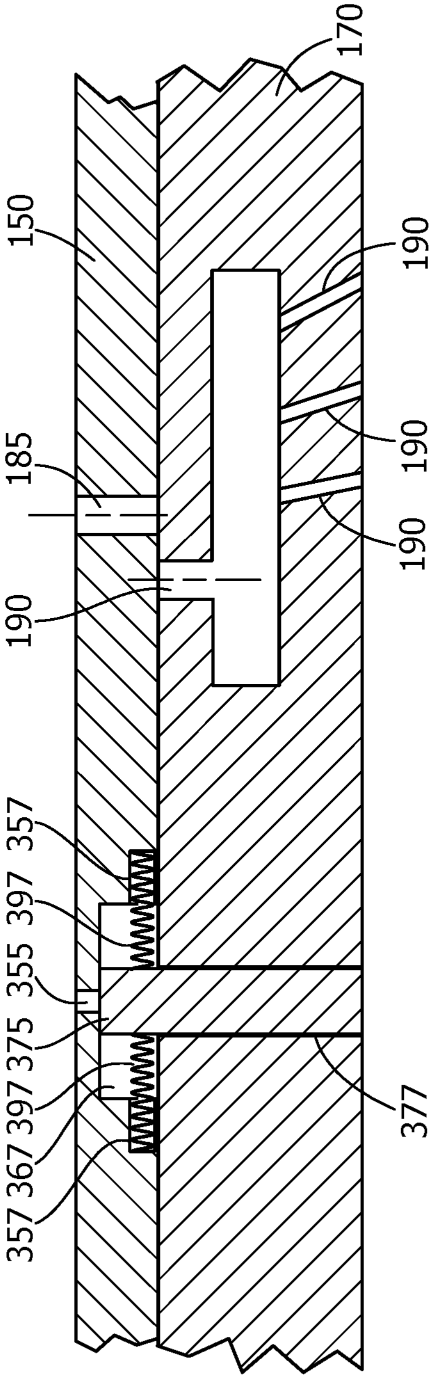
FIGS. 6A and 6B represent enlarged partial cross-sectional views of an alternate embodiment of the operating mechanism of the multi-function shower head of FIG. 1.
Figure 6B:
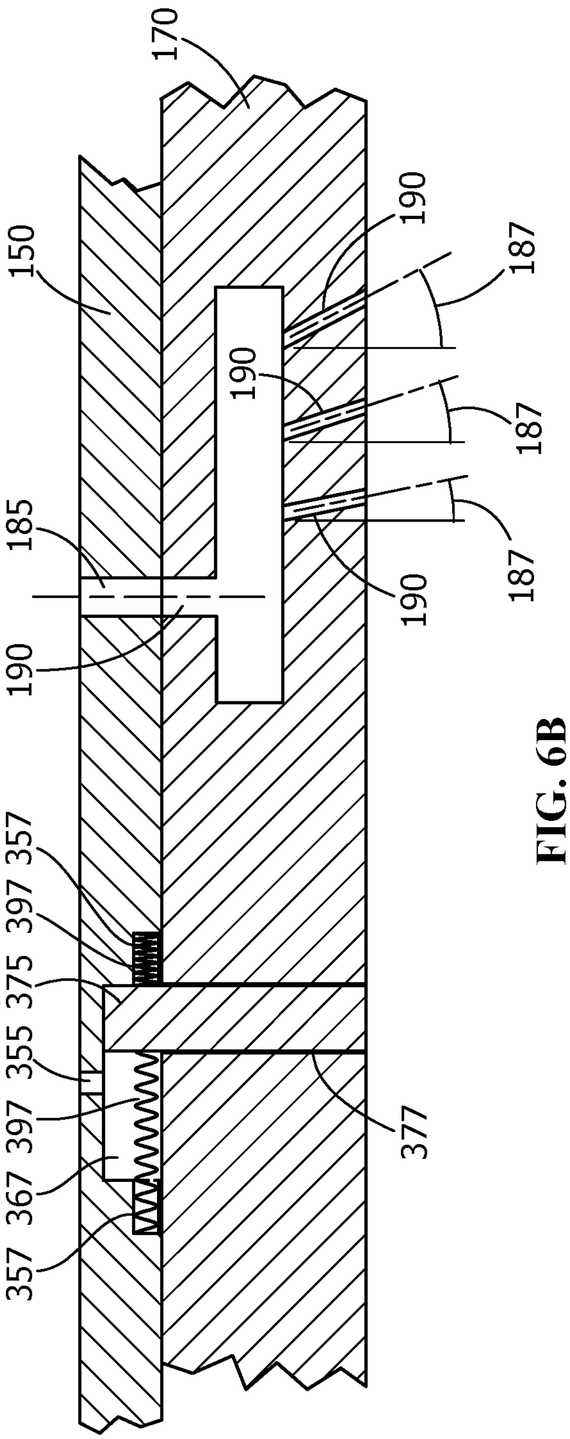

FIGS. 6A and 6B represent an embodiment showing both the operating mechanism and an arrangement of spray holes 190 according to an embodiment of this invention. The operating mechanism of FIGS. 6A and 6B operates as shown and described with respect to FIGS. 4A and 4B. As the pressure chamber 367 is filled, the sliding ring 170 is driven to the right, as shown in FIG. 6B, to line up the water passage 185 with spray holes 190. As described with respect to FIGS. 4A and 4B, the actuation may be in the opposite direction and may result in the lining up of different spray holes 190. Upon lining up the passages, water is permitted to flow through the passages and spray at spray angles 187. As shown in FIGS. 6A and 6B, the second spray pattern includes a plurality of spray holes that spray water at angles independent of one another. Although FIGS. 6A and 6B show multiple spray holes 190 and differing spray angles 187, the invention is not so limited and may include any number of spray holes 190 and the same or different spray angles 187. The second spray pattern may include a plurality of spray holes wherein an inlet spray hole feeds the plurality of spray holes and is sufficiently large to provide sufficient water pressure to the plurality of spray holes. An example of sufficient water pressure is water pressure that is substantial equal to the pressure at the direct spray holes 180.

The spray pattern activation may be blocked with a set screw or pin. A set screw in the upper housing 110 may be used to limit total flow and conserve water.

The actuator spring 397 may be made of any suitable material, including without limitation, a stainless-steel spring.

The device may be at least one of a wall-mounted adjustable shower head and hand-held shower head.

The upper housing 110 and lower housing 120 may be connected by any suitable means, including without limitation, screw threads or multiple small diameter screws.

The upper housing 110 and base plate 150 may be manufactured as a single unit, eliminating the need for the locating cavity 140 and retention means 160. The locating cavity 140 in the upper housing 110 may have a protrusion fitting a cavity in the base plate 150 providing the rotational location of the base plate 150 otherwise provided by retention means 160. Alternatively, the locating cavity 140 of the upper housing 110 may have a cavity fitting a protrusion on the base plate 150 for the same purpose.

The sliding ring 170 may be designed to block some of the direct spray holes 180 in the base plate 150 when the sliding ring 170 is in the wide pattern position, to maintain a more even flow rate through the individual spray holes. Alternatively, the spring cavity 357 may be located in the pressure dam 375.

In an embodiment, the multi-function shower head 100 may utilize more than one sliding ring 170, for example, first and second sliding rings 170. The first sliding ring 170 may be positioned inside the diameter of the second sliding ring 170. The first sliding ring 170 may be axially retained in a lip on the second sliding ring 170. The base plate 150 or the lower housing 120 may include a retainer extension to retain at least one of the first and second sliding rings 170. The first and second sliding rings 170 may be in such a parallel arrangement. The second sliding ring 170 may be positioned over the first sliding ring 170 in series and provide additional spray patterns upon activation. The sliding rings 170 may have a diameter equal to, less than or greater than the diameter of the base plate 150 or spray area. The sliding rings 170 may bottom out on each other at a set distance apart with the least amount of clearance that provides satisfactory friction to the serial sliding ring 170 arrangement as determined by the dimensions of the components and a space between a lip of the lower housing 120 that retains the sliding ring 170 and a step in the lower housing 120 that bottoms out against a step in the upper housing 110, as well as the position of a mating step in the upper housing 110 relative to the locating cavity 140. With the base plate and upper housing as one unit the lower housing only has to capture the sliding ring or sliding rings.

The device is assembled by pressing the base plate 150 and the sliding ring 170 together such that the at least one pressure dam 375 is positioned within at least one pressure chamber 367. Base plate 150 and sliding ring 170 are then separated to a distance that keeps the pressure dam 375 on the pressure chamber 367 but separated far enough to accommodate sliding the spring 397 between them. At least one actuator spring 397 is pressed between the base plate 150 and sliding ring 170 into at least one spring cavity 357 and against the pressure dams 375 so as to push at least one pressure chamber 367 to a closed position with the actuator supply hole 355 facing the solid upper surface of a pressure dam 375.

A thin plate or pliers with a thickness of about half that of the actuator spring 397 may be used to position the actuator spring 397 against the pressure dam 375 to compress slightly more than the distance between the pressure dam 375 and the end of the spring cavity 357 of the base plate 150. The plate or pliers can be withdrawn after the spring 397 drops into the spring cavity 357 after which the base plate 150 and sliding ring 170 can be pressed fully together.

The base plate 150 and sliding ring 170 with at least one actuator spring 397 is now assembled into the upper housing 110, such that a retention means 160 locks the rotational position of the base plate 150 in the upper housing 110 while the locating cavity 140 locates the base plate 150 radially. The lower housing 120 is then positioned to hold the assembled sliding ring 170 and base plate 150 while screw thread 130 or other fastening means locks the assembly between the upper housing 110 and lower housing 120. Base plate 150 may be fastened to the upper housing 110.

The base plate 150 may be equipped with a lip at its outer diameter, to envelope the sliding ring 170 to better maintain axial and radial clearances during assembly and control operating friction. Alternatively, the inner diameter of the sliding ring 170 may be located against a lip on the base plate 150.

The lower housing 120 may be screwed onto the upper housing 110 forming a sliding fit between the sliding ring 170 and the base plate 150 and the sliding ring 170 and the lower housing 120. The entire assembly may then be connected to any suitable water source at the open end 105 for water entry of the shower head 100.

When water enters the open end 105, the shower head 100 will fill and water will flow through the spray holes 180 of the base plate 150.

Manual rotation of the sliding ring 170 via actuator 195 may open the pressure chambers 367 allowing water flow through the actuator supply hole 355 and into the pressure chambers 367. The pressure chambers 367 may be kept in the open position, and filled with water, while aligning the water passages 185 of the base plate 150 with the wide spray holes 190 of the sliding ring 170, facilitating the wider, second, spray pattern. Vents 377 of the sliding ring 170 minimize pressure building up behind the pressure dams 375 during actuation or with the activated wide spray pattern, so that the water pressure in the pressure chambers 367 keep the pressure chambers 367 in the open position and the wider, second, spray pattern activated. And upon the pressure dam 375 returning to the neutral position after passing the supply hole 355 the vent facilitates water to exit from the pressure chamber 367 while the compression spring 397 expands and during manual operation to the opposite extreme actuation position.

Upon an interruption in water flow (in which case the water pressure drops to ambient) or an otherwise sufficient drop in water pressure from the water source, the actuator spring 397 returns the pressure dams 375 in the pressure chambers 367 to the closed, neutral, position blocking the actuator supply holes 355 and wider spray pattern through the wide spray holes 190. The wider spray pattern may only be reactivated by applying water flow and pressure as well as the manual positioning of the sliding ring 170 against the action of the actuator spring 397.

The spring mechanism may push and/or pull the sliding ring 170 to the first spray pattern upon interrupted water flow through the base plate 150, while water pressure keeps the sliding ring 170 in at least a second spray position with manual adjustment. When the spring mechanism pulls the sliding ring 170, the spring may be attached to pressure dam 375 on one end and the back of spring cavity 357 on the other end.

When the water pressure is interrupted, the spring action brings the sliding ring 170 back in the first spray pattern position, deactivating the second spray pattern. In an embodiment, the first spray pattern is the relatively narrower spray pattern and the second spray pattern is the relatively wider spray pattern.

The manual adjustment feature may have a single actuator 195, such as an adjustment lever, or multiple adjustment levers. In an embodiment, the manual adjustment feature includes actuators 195, such as two levers, approximately 180 degrees opposed. The spring mechanism may include a single spring or multiple springs. In an embodiment, the spring mechanism includes two springs, approximately 180 degrees opposed. The pressure face of the pressure dam 375 that helps maintain the wide spray pattern by means of the water pressure may be singular, or multiple. In an embodiment, the pressure face includes two positions. The spring feature may be combined with the pressure face feature.

In another embodiment, actuator 195 includes a rod extending downward form the body of the shower head 100. In one embodiment, the shower head 100 is mounted high on a ceiling, wherein the rod actuator 195 extends downward to a length corresponding to a suitable height that does not result in injury to the user. The rod may include a gear arrangement, friction wheel, or elastic band to rotate the sliding ring 170 and actuate the shower head 100 from the first spray pattern to the second spray pattern or the third spray pattern. A ball-like grip or other similar suitable configuration may present on the user end of the rod to prevent injury and facilitate easier rotation and easier actuation of the sliding ring 170.

Figure 7:
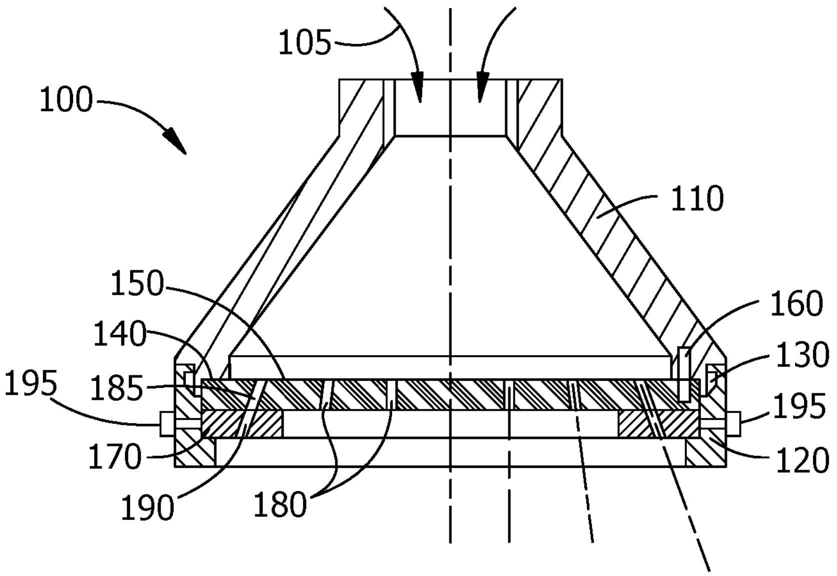
FIG. 7 is a cross sectional view of a multi-function shower head with operating mechanism in accordance with another non-limiting embodiment of this invention.
Figure 8:
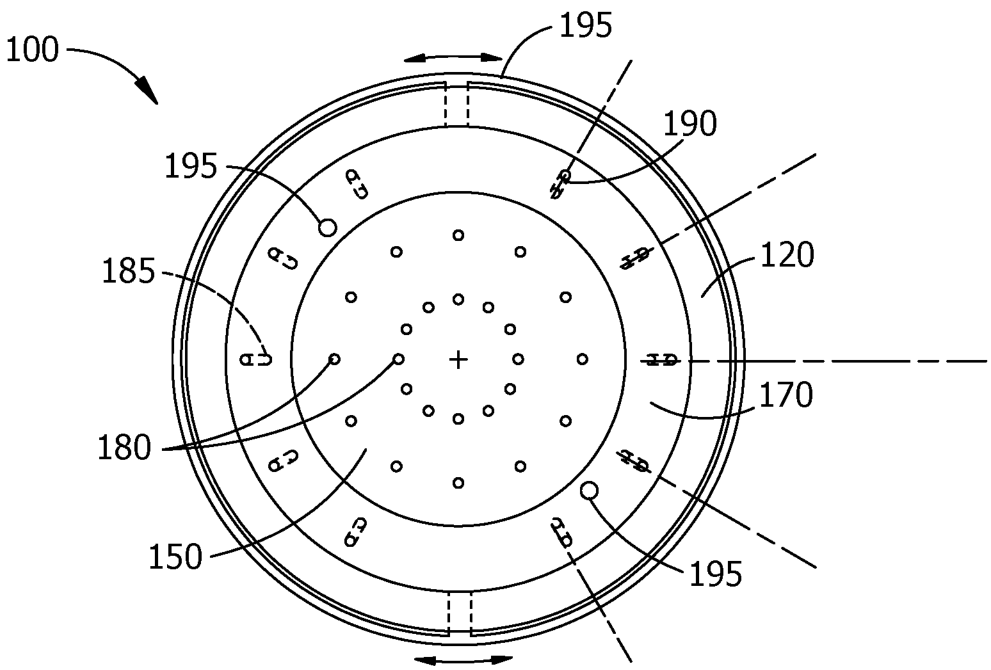
FIG. 8 is a lower plan view of the lower housing of the multi-function shower head with operating mechanism of FIG. 7.

FIGS. 7 and 8 show an embodiment of a multi-function shower head 100 according to an embodiment of this invention, wherein the shower head 100 includes an actuator on the outer edge of the body. The arrangement of the shower head 100 is the same as shown and described with respect to FIGS. 1 and 2. However, in FIGS. 7 and 8, actuator 195 includes a ring that attaches to the sliding ring 170 through lower housing 120. Although FIGS. 7 and 8 include a ring geometry, other geometries, such as, but not limited to, levers or protrusions, may be utilized. The actuator 195 is permitted to rotate in either direction about the center axis of the shower head 100 to drive the sliding ring 170 and activate the second spray pattern provided by the operating mechanism (see, for example, FIGS. 3A-3E, 4A-4B, 5 and 6A-6B). Upon discontinuing the flow of water, and a drop in water pressure, like in the above embodiments, the sliding ring 170 and the actuator 195 return to their original position. While the above have been shown and described as mechanical actuators, actuator 195 may be driven by any suitable driving mechanism, including electrical motors or solenoids. Likewise, the configuration and geometry of the actuator 195 is not specifically limited and may be mounted in alternate locations that permit rotation of the sliding ring 170. The actuators 195 may be directly attached to the shower head 100 or may be remote from the shower head 100. In one embodiment, an extension, elongate protrusion or similar mechanical arrangement extending toward the user may be provided to allow easier access to the actuator for those unable to easily reach the shower head.

The device depicts a multi-function shower head 100 with no additional plumbing and/or fixtures required to provide an additional spray pattern. There is also no chance that at least the second spray pattern will spray upon reactivation of water flow. There is also no significant water temperature drop when changing from one spray pattern to another, for example, from the first spray pattern to a second spray pattern. The multi-function shower head is simple to operate.

More than one adjustable sliding ring 170 may be incorporated in one multi-function shower head. An adjustable pattern may include, without limitation, an additional pattern to an existing or permanent base pattern in the base plate 150, or an alternative pattern that shuts off the base pattern or changes the base pattern at the same time as presenting the additional wider pattern. An adjustable pattern may be positioned on the perimeter of a stationary pattern or on the inside to reduce friction due to a smaller radius. When the spring mechanism is to pull the sliding ring 170, the spring mechanism is attached to pressure dam 375 on one end and the back of spring cavity 357 on the other end. Electronic means and electric sensors and actuators may be used to do the same with increased cost.

Suitable materials for the shower head may include, for example, without limitation, those that facilitate cleaning of calcium deposits, are lightweight and durable.

The base plate 150 may be made of any suitable material. Suitable materials may include nylon. In particular, without limitation, nylon materials may include Nylon 66, acetal, and chlorinated poly vinyl chloride. Other suitable materials include, without limitation, low friction polymers, including Teflon which is a tough synthetic resin made by polymerizing tetrafluoroethylene. Such materials provide low friction contact with the sliding ring 170, for example, a metal or plastic sliding ring. Ceramic materials may also be used that provide low friction when lubricated with water. Metallic materials may also be used that can provide low friction in contact with plastic materials.

Sliding surfaces may be grooved or otherwise textured to reduce operating friction.

The sliding ring 170 may be coated with a low friction coating on at least one of the axial faces, outer diameter and opposing surfaces to minimize friction and increase ease of operation. Suitable coatings include, without limitation, Teflon, diamond, diamond-like, PVD nitride, CVD carbide, or sol-gel oxide.

The materials and construction may be for easy assembling, disassembling, or for cleaning. In an embodiment, materials may be sealed for life, for example, without limitation, a coating may be applied to the materials. Coatings and linings may be used to reduce calcium buildup and reduce friction between the parts, for example, the sliding ring 170 and base plate 150 and lower housing 120.

Internal surfaces of the multi-function shower head may be coated. Suitable coatings include, without limitation, anti-wetting or protective coatings to minimize and/or prevent clogging or build-up of mineral deposits.

External surfaces of the multi-function shower head may be coated. Suitable coatings include, without limitation, anti-wetting or other protective coatings to minimize staining, reduce wear or enhance appearance.

Other suitable materials and coatings may include without limitation, anti-bacterial and self-cleaning materials and coatings.

The multi-function shower head may be attached to an approximately 0.75 to 1-inch diameter shower water supply line, or a swivel head fixture attached to the supply line, or in a shower fixture that may be operated in different orientations or positions or incorporated in a hand shower fixture. The shower head may be a handheld shower head, which may be mounted on a vertical pole with height adjustment on the vertical pole. For the showerhead directly mounted to the water supply pipe it would be desirable to include a ball joint angle adjustment feature at the top of the upper housing 110.

The multi-function shower head may be manually adjusted in at least one of a clock-wise rotation, a counter clock-wise rotation, and a linear motion to adjust the spray pattern.

The multi-function shower head may be designed to operate by axial translation versus rotation with the same operating mechanism as shown in FIG. 3 where there is no curvature to the base plate 150 of FIG. 3A, nor the sliding ring of FIG. 3E.

Residential water pressure is generally set at about 45 psi. It may be set at about 45 psi to about 70 psi with an upper limit of about 80 psi to about 100 psi. In order to exert 0.5 pound force, it takes about 0.007 square inch or an area of about 0.1×0.07 inch, at 70 psi and to exert 1 pound force, at 50 psi it takes 0.2×0.1 inch. The design may make operation independent of water pressure within normal residential pressure limits.

The multi-function shower head may be in combination with or incorporate adjustments of flow and/or temperature, aeration of the water, or additional adjustments including, without limitation, the flow patterns including interrupted "massage" features, a pause feature to stop all or nearly all flow, self-cleaning or anti clog nozzles, water filters, cleaners and purifiers, and provide microbial protection.

A ball valve may be incorporated in the upper housing 110 to stop flow for the pause feature and does not require the user to make adjustments to the hot and cold water supply. This causes the first spray pattern to resume upon re-activation of the water flow.

Figure 2:
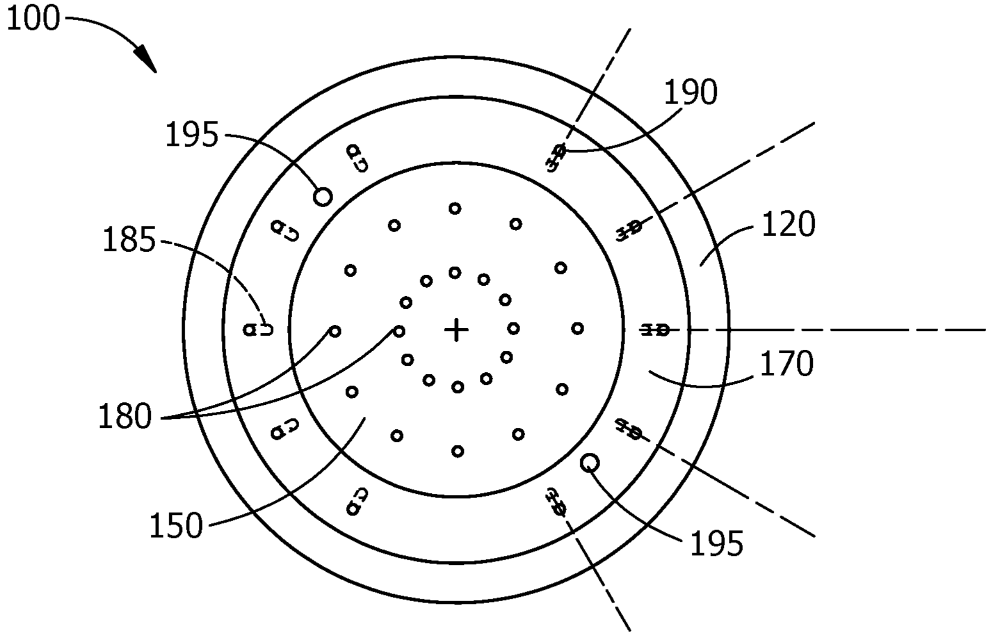
FIG. 2 is a lower plan view of the lower housing of the multi-function shower head with operating mechanism of FIG. 1. Also showing 180 degrees of a wide spray pattern of an oval shape.

Operating lugs fitted to the sliding ring may be designed to extend to a greater radius than shown in FIG. 2, even beyond the outside diameter of the fixture, for increased leverage or more intuitive or easier operation. Operating lugs may be a radially outward and/or inward extension of the actuator 195. A stainless-steel spring of 0.5-inch length, 0.3 inch diameter with three windings of 0.02 inch wire, produces a force of approximately 1 pound when compressed. Nayak et al. Pinch grip, power grip and wrist twisting strengths of healthy older adults. Gerontology 2004, 3(2) 77-88 shows that the lower 5% of older females are able to generate 1.32 NM=11.68 inch pounds, or 2.9 pounds over a 4-inch diameter.

Seals and O-rings may be incorporated in the design to minimize water leakage.

Bearings may be incorporated to minimize friction. Suitable bearings include, without limitation, ball or roller bearings or hydrostatic bearing pockets between moving surfaces fed by water passages.

The diameter of the water passages 185 in base plate 150 may be larger than the diameter of the wide pattern spray holes 190 of the second spray pattern to facilitate flow and reduce the effect of minor misalignment between the two, reducing the need for tight tolerances. Alternatively, the wide pattern spray holes 190 may have a larger diameter than the water passages 185, for the same benefit.

Flow features may be incorporated in the adjustable shower head to direct water flow to, or away from, the wider spray pattern.

The second spray pattern may be angled in the radial direction as well as in the tangential direction and may provide additional rotating movement on the sliding ring 170.

In an embodiment, manually moving the sliding ring 170 from the open position with activated second spray pattern, to the first spray pattern position with de-activated second spray pattern, leaves the sliding ring 170 in the original, neutral position, with the actuator supply hole 355 closed by the pressure dam 375, and no water flow to the pressure chamber 367.

The diameter and length of the spray holes may be varied to direct more, or less, flow to different patterns or parts of patterns. Similarly, the flow through the holes of an anti-clogging spray may be adjusted by adjusting the size of the holes.

Individual spray holes may be designed to be directionally adjustable, for example, by incorporating at least one of a bearing feature, a membrane around the spray hole formed by a capillary tube.

Pockets or profiles in the contact surfaces of the sliding ring 170 may be filled with pressurized water to reduce interface forces and friction forces.

The pattern may be asymmetrical, including, for example, wider in one direction and not symmetrical in 360 degrees. It may be desirable to be able to rotate the pattern a number of degrees, for example, 90 degrees, by an alternative or additional retention means 160.

Figure 10A:
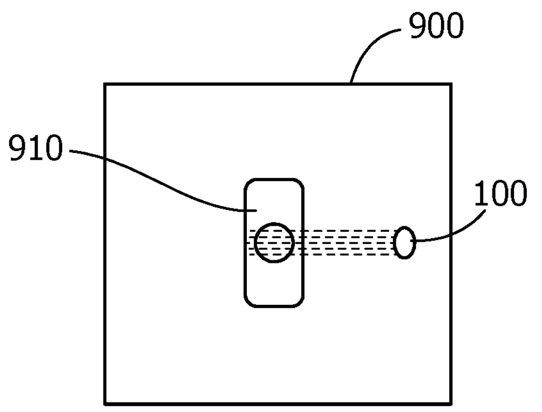
FIGS. 10A through 10C represent a schematic top view of the shower arrangement of FIG. 9 utilizing a multi-function shower head in various spray modes in accordance with an embodiment of this invention.
Figure 10B:
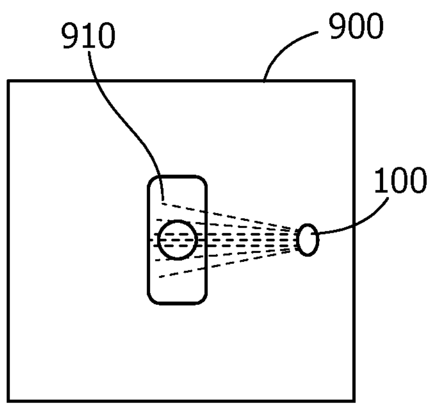
Figure 10C:
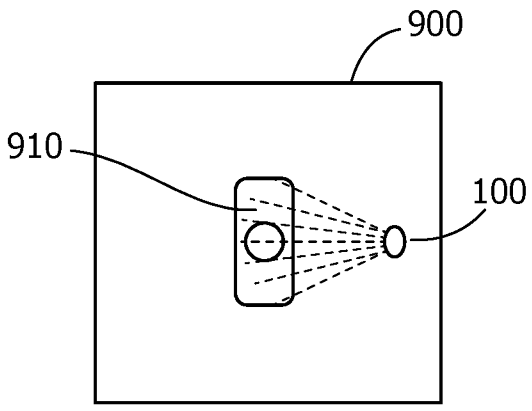
Figure 11A:
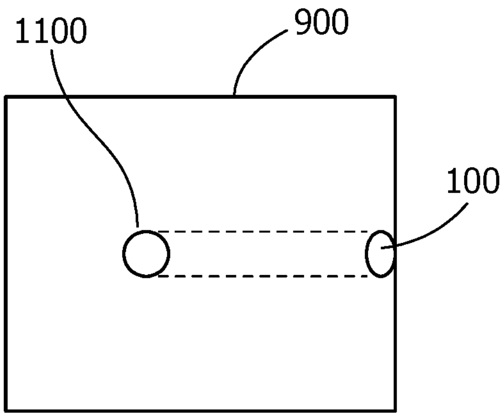
FIGS. 11A through 11C represent a schematic top view of the shower arrangement of FIG. 9 utilizing a multi-function shower head forming various spray patterns in accordance with an embodiment of this invention.
Figure 11B:
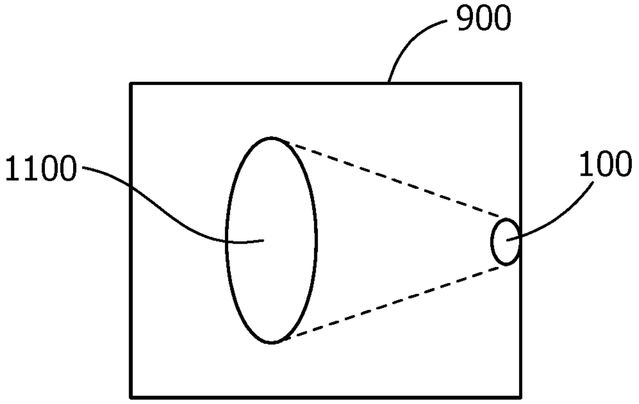
Figure 11C:
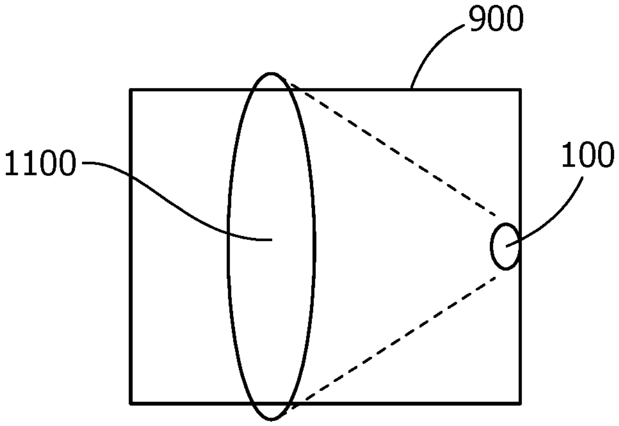

As shown in FIGS. 2, 10C and 11C, a wide pattern may include an elliptical or oval pattern that emanates from spray holes 190 to keep the user's shoulders and arms rinsed and warm in a cold bathroom without the user having to move back and forth under the spray pattern.

Figure 9:
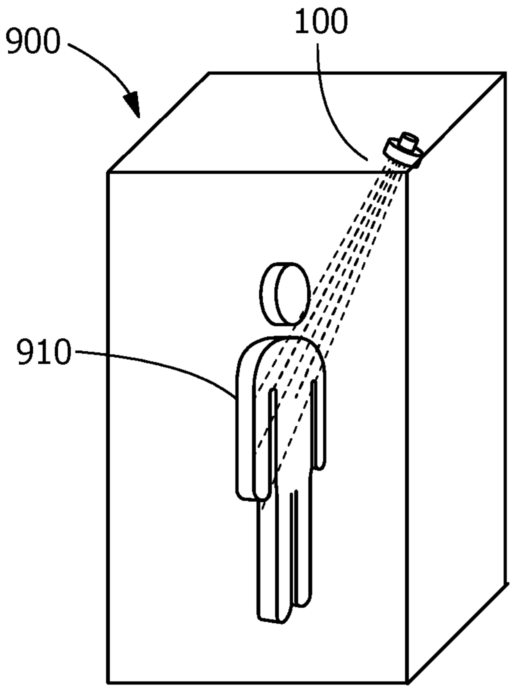
FIG. 9 shows a shower arrangement including a multi-function shower head in accordance with an embodiment of this invention.

FIG. 9 shows a view of an exemplary embodiment of a shower arrangement 900 according to an embodiment. Specifically, a user 910 is positioned within a shower arrangement 900 with a shower head 100 according to the present invention. The user 910 may adjust the shower head 100 by moving the actuator as previously described to change the spray patterns. FIGS. 10A-10C show a top view of shower arrangement 900 including the spray patterns with respect to user 910. The user 910 includes a width corresponding to the length extending between the user's shoulders. FIG. 10A shows an example of a first spray pattern directed toward user 910 wherein actuator 195 has not been moved. FIG. 10B shows an example of a second spray pattern directed toward user 910 when the actuator 195 has been moved in a first direction (e.g., right or left). FIG. 10C shows an example of a third spray pattern directed toward user 910 when the actuator 195 has been moved in a direction opposite the direction shown in FIG. 10B. The spray patterns shown in FIGS. 10A-10C are merely exemplary and alternate spray patterns may be provided for the various positions of the actuator 195. Once the water flow to shower head 100 is discontinued, and the water pressure inside the upper housing has dropped, the actuator 195 and the sliding ring 170 return to the original position and the spray pattern would be provided as shown in FIG. 10A.

FIGS. 11A through 11B show a top view of an exemplary embodiment of a shower arrangement 900 including exemplary spray patterns 1101 with respect to the shower arrangement 900. FIG. 11A shows an example of a first spray pattern directed toward user 910 wherein actuator 195 has not been moved. FIG. 11B shows an example of a second spray pattern directed toward user 910 when the actuator 195 has been moved in a first direction (e.g., right or left). FIG. 11C shows an example of a third spray pattern directed toward user 910 when the actuator 195 has been moved in a direction opposite the direction shown in FIG. 11B. It is noted that the spray pattern 1100 of FIG. 11C may extend outside the shower arrangement and may be deflected by the walls, doors or curtains of the shower arrangement 900. In one embodiment, the actuation from the first spray pattern to the second spray pattern or the third spray pattern results in a temperature change of the water that is sufficiently small to be imperceptible by the user. For example, the temperature change provided by the change from the first spray pattern to the second spray pattern is less than 5° F. or less than 2° F. or less than 1° F., for a half second or less. This lack of temperature drop permits the user to maintain warmth during the utilization of the shower arrangement 900. Once the water flow to shower head 100 is discontinued, and the water pressure inside the upper housing has dropped, the actuator 195 and the sliding ring 170 return to the original position and the spray pattern would be provided as shown in FIG. 11A. As can be recognized, the return of the shower head 100 to the original position provides significant advantage in providing a shower that permits full coverage of the user 910, including their shoulders, but returning the spray pattern to one that does not have the disadvantage of potentially being outside the shower curtain or door, as would be the case for the spray pattern of FIG. 11C. The second spray pattern provides warmth to both shoulders of the user during utilization of the shower arrangement.

While the invention has been described in terms of specific or particular embodiments, it should be apparent that alternatives could be adopted by one skilled in the art. For example, the device and its components could differ in appearance and construction from the embodiments described herein and shown in the drawings, functions of certain components of the device could be performed by components of different construction but capable of a similar (though not necessarily equivalent) function, and various materials could be used in the fabrication of the device and/or its components. In addition, the invention encompasses additional or alternative embodiments in which one or more features or aspects of a particular embodiment could be eliminated or two or more features or aspects of different disclosed embodiments could be combined. Accordingly, it should be understood that the invention is not necessarily limited to any embodiment described herein or illustrated in the drawings. It should also be understood that the phraseology and terminology employed above are for the purpose of describing the embodiments, and do not necessarily serve as limitations to the scope of the invention. Therefore, the scope of the invention is to be limited only by the following claims.

The invention claimed is:

1. A multi-function shower head comprising:

an upper housing having an open end for water entry;

a lower housing coupled to the upper housing opposite the open end thereof;

a base plate received in a recessed locating cavity of the upper housing or the base plate being an integral part of the upper housing, the base plate having at least one water passage and at least one direct spray hole therethrough for selectively enabling water outflow from the upper housing through the base plate;

a sliding ring held by the lower housing against the base plate and having and at least a second spray pattern therein;

at least one actuator for rotating the sliding ring relative to the base plate and thereby selectively align the second spray pattern in the sliding ring with the water passages in the base plate and to adjust from a first spray pattern to the second spray pattern; and wherein the base plate and the sliding ring are arranged and disposed with an operating mechanism to automatically adjust the water flow from the second spray pattern to the first spray pattern upon interrupting water flow through, and pressure to the base plate, the operating mechanism comprising at least one actuator supply hole, at least one pressure chamber and at least one spring cavity formed in the base plate.

2. The multi-function shower head according to claim 1, wherein the operating mechanism comprises at least one pressure dam operably connected to the sliding ring and extending into the at least one pressure chamber of the base plate.

3. The multi-function shower head according to claim 2, wherein the at least one pressure dam further comprises vents on at least one side thereof; and at least one actuator spring fitted in the at least one spring cavity of the base plate.

4. The multi-function shower head according to claim 3, wherein the sliding ring is actuated to facilitate water entry upon exposing at least one actuator supply hole to the at least one pressure chamber and water entry enables the at least one pressure dam to adjust to the end of the pressure chamber.

5. The multi-function shower head according to claim 3, wherein the at least one pressure chamber includes a first and second pressure chamber, at least one actuator supply hole includes a first and second actuator supply hole, at least one actuator spring includes a first and second actuator spring and at least one pressure dam includes a first and second pressure dam.

6. The multi-function shower head according to claim 5, wherein the first and second pressure dams adjust to the right side of the first and second pressure chambers enabling compression of the second actuator spring in the second, right, spring cavity.

7. The multi-function shower head according to claim 6, wherein the first pressure dam blocks the first actuator supply hole to prevent water entry into the first pressure chamber.

8. The multi-function shower head according to claim 5, wherein the first and second pressure dams adjust to the left side of the first and second pressure chambers enabling compression of the first actuator spring in the first spring cavity.

9. The multi-function shower head according to claim 8, wherein the second pressure dam blocks the second actuator supply hole to prevent water entry into the second pressure chamber.

10. The multi-function shower head according to claim 1, wherein the sliding ring is held by at least one actuator spring and enables the first spray pattern when the sliding ring is in a closed, neutral, position.

11. The multi-function shower head according to claim 1, wherein the sliding ring enables the second spray pattern when the sliding ring is actuated to a second position, at least one actuator spring is maintained in the compressed condition while water flows through the base plate and the sliding ring automatically rotates to a closed, neutral, position upon interrupting water flow through, and water pressure to, the base plate.

12. The multi-function shower head according to claim 1, wherein the first spray pattern is narrower than the second spray pattern.

13. The multi-function shower head according to claim 1, wherein the sliding ring further comprises a third spray pattern.

14. The multi-function shower head according to claim 13, wherein at least one of the three spray patterns can be blocked.

15. The multi-function shower head according to claim 1, wherein the second spray pattern includes a spray angle equal to or greater from a center line/central axis than 5°.

16. The multi-function shower head according to claim 1, wherein the second spray pattern includes a spray angle equal to or greater from a center line/central axis than 10°.

17. The multi-function shower head according to claim 1, wherein the second spray pattern having a spray angle from 10° to 35° from a center line/central axis.

* * * * *